US 6,606,465 B2

(12) United States Patent
Mutoh et al.

(10) Patent No.: US 6,606,465 B2
(45) Date of Patent: Aug. 12, 2003

(54) FUNCTION DISPLAY METHOD AND MULTI-FUNCTIONAL APPARATUS HAVING DISPLAY EMBODYING SUCH METHOD

(75) Inventors: Takeshi Mutoh, Nara (JP); Masao Murakami, Yamatokoriyama (JP); Kenji Itoh, Hirakata (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/731,472

(22) Filed: Dec. 7, 2000

(65) Prior Publication Data

US 2001/0004424 A1 Jun. 21, 2001

(30) Foreign Application Priority Data

Dec. 8, 1999 (JP) .......................................... 11-349210

(51) Int. Cl.⁷ .......................... G03G 15/00; H04N 1/00; G09G 5/00
(52) U.S. Cl. .......................... 399/81; 345/764; 345/771; 345/810; 345/822; 345/824; 345/838; 358/400; 399/1; 399/2
(58) Field of Search .................. 399/81, 1, 2; 345/764, 345/767, 771, 810, 821, 822, 823, 824, 835, 838, 845; 358/400

(56) References Cited

U.S. PATENT DOCUMENTS

| | | | | |
|---|---|---|---|---|
| 4,937,762 A | * | 6/1990 | Todome ........................ 399/81 |
| 5,179,655 A | * | 1/1993 | Noguchi et al. ............ 345/835 |
| 5,463,448 A | * | 10/1995 | Wilson et al. ................. 399/1 |
| 5,717,977 A | * | 2/1998 | Suzuki et al. ................. 399/81 |
| 5,748,927 A | * | 5/1998 | Stein et al. ................. 345/835 |
| 5,973,694 A | * | 10/1999 | Steele et al. ................ 345/835 |
| 6,002,868 A | * | 12/1999 | Jenkins et al. .............. 345/810 |
| 6,222,532 B1 | * | 4/2001 | Ceccarelli |
| 6,308,023 B1 | * | 10/2001 | Nomura et al. ............... 399/81 |
| 6,323,883 B1 | * | 11/2001 | Minoura et al. |
| 6,362,840 B1 | * | 3/2002 | Burg et al. ................. 345/835 |
| 6,448,987 B1 | * | 9/2002 | Easty et al. ................ 345/834 |

FOREIGN PATENT DOCUMENTS

| | | | |
|---|---|---|---|
| JP | 63-231366 | | 9/1988 |
| JP | 6-278082 | * | 6/1994 |
| JP | 10-222015 | | 8/1998 |
| JP | 2000-357036 | * | 12/2000 |

* cited by examiner

Primary Examiner—Susan S. Y. Lee
(74) Attorney, Agent, or Firm—David G. Conlin; William J. Daley, Jr.; Edwards & Angell, LLP

(57) ABSTRACT

When any of the functions: copier function, printer function and facsimile function, are not being performed, the function information display portion provides display messages 'Copier available', 'Printer available' and Fax available', using the display areas equal in size, arranged in the vertical direction. When a print request is given from an external apparatus, the function information display portion provides a display message 'Printer function engaged' along with the image processing operating conditions and provides display messages 'Copier function partly available' and 'Facsimile function partly available' in the left and right halves of the display section. While the printer function is in progress, the information relating to the printer function is displayed in the display area four times as large as that for the copier function and that for the facsimile function.

13 Claims, 8 Drawing Sheets

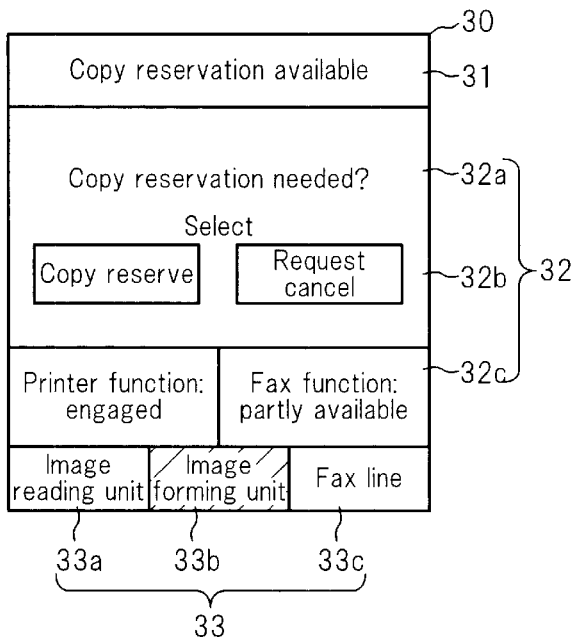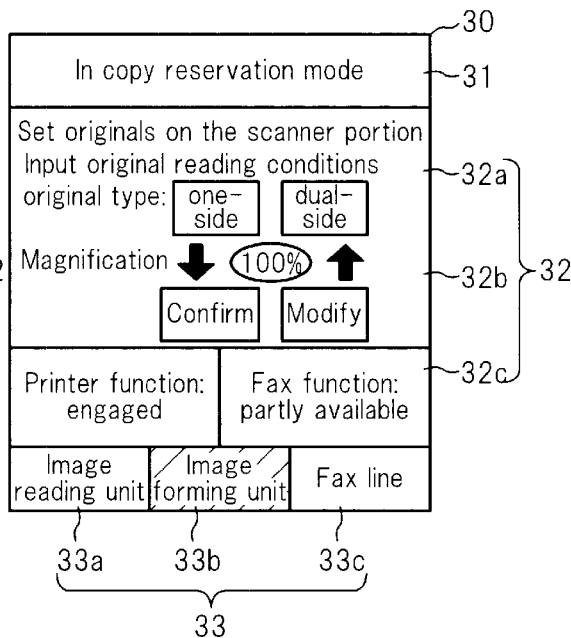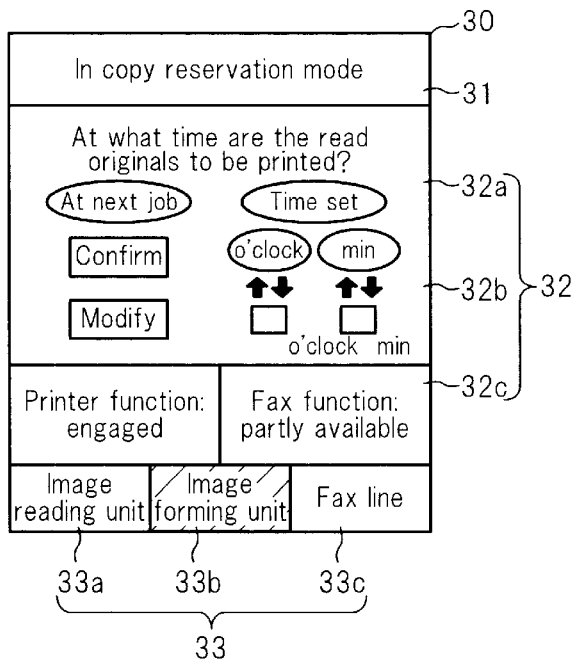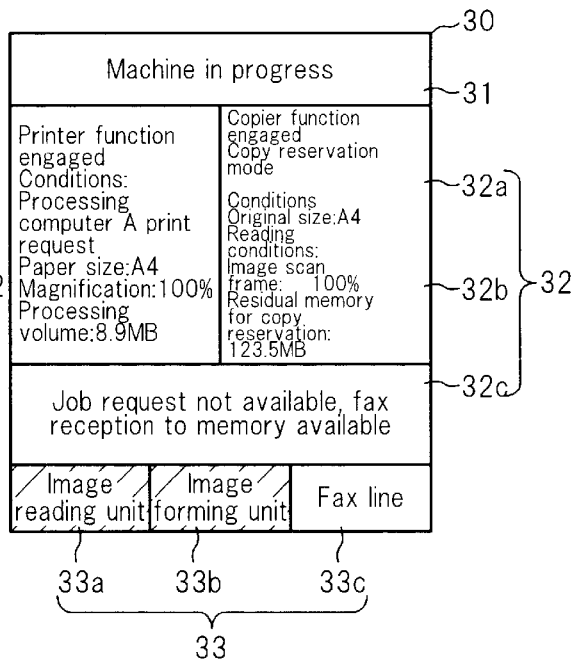

FIG. 7A

| Image reading unit and Fax line is available |||
|---|---|---|
| Input the destination |||
| 1 2 3 / 4 5 6 / 7 8 9 / 0 | Destination: 0123-XX-XXXX Continue input ||
| Image forming unit/Fax line:engaged | Image reading unit: ready ||

FIG. 7B

| Image reading unit and Fax line is available ||
|---|---|
| Destination input correct? 0123-45-6789  [Confirm] [Modify]  Set originals to be sent on the scanner portion ||
| Image forming unit/Fax line:engaged | Image reading unit: ready |

FIG. 7C

| Image reading unit and Fax line is available ||
|---|---|
| Destination : 0123-45-6789 Transmit ?  [Transmit] ||
| Image forming unit/Fax line:engaged | Image reading unit: ready |

FIG. 7D

| All function in progress ||
|---|---|
| Image forming unit engaged Conditions: Processing computer A print request Paper size: A4 Magnification:100% Processing volume:8.9MB | Destination : 0123-45-6789  [During transmission] |
| Job request not available ||

FIG.8A

| Copy request not available so that image forming unit is engaged |
|---|
| Copy reservation needed?<br>Select<br>[Copy reserve]　[Request cancel] |
| Fax line:ready ｜ Image reading unit: ready |

FIG.8B

| In copy reservation mode |
|---|
| Set originals on the scanner portion<br>Input original reading conditions<br>Original type: [one-side] [dual-side]<br>Magnification ⬇ (100%) ⬆<br>[Confirm] [Modify] |
| Image forming unit/Image reading unit:engaged ｜ FAX line: ready |

FIG.8C

| In copy reservation mode |
|---|
| At what time are the read originals to be printed?<br>(At next job)　(Time set)<br>[Confirm]　(o'clock) (min)<br>[Modify]　⬆⬇　⬆⬇<br>　　　　　□　　□<br>　　　　o'clock　min |
| Job request not available, fax reception to memory available |

FIG.8D

| Machine in progress |
|---|
| Image forming unit engaged Conditions: Processing computer A print request Paper size:A4 Magnification:100% Processing volume:8.9MB ｜ Copy reservation mode engaged Conditions Original size :A4 Reading conditions : Image scan frame : 100% Residual memory for copy reservation : 123.5MB |
| Job request not available, fax reception to memory available |

FUNCTION DISPLAY METHOD AND MULTI-FUNCTIONAL APPARATUS HAVING DISPLAY EMBODYING SUCH METHOD

BACKGROUND OF THE INVENTION (1) Field of the Invention

The present invention relates to a function display method for displaying the job status of each function in an apparatus having multiple functions.

(2) Description of the Prior Art

There have been put on the market many kinds of multi-functional machines, which basically works as a copier that effects the function of a copier, i.e., scans an original image through the original reading unit and reproduces the scanned original image on paper by means of the image forming unit, and which also have the function of a printer for forming the images prepared by an external apparatus on paper by means of the image forming unit as well as the function of a facsimile machine for transmitting the original images scanned by the original reading unit to an external apparatus. In such multi-functional machines, the items to be set, including operating conditions may in part or as a whole differ dependent upon each function. If such a multi-functional machine have separate control means such as key switches, etc., for all the items to be set, the arrangement of the controller becomes too complicated, making it impossible to achieve user-friendly input control for the items to be set according to the function to be performed.

Japanese Patent Application Laid-Open Hei 10 No.222015 discloses a display configuration which includes a functional item display area cable of displaying a multiple number of functional items, each having a selected functional option corresponding thereto and a functional option display area which, when a functional item is selected from the functional item display area, displays a multiple number of functional options corresponding to the selected functional item, wherein the functional option display area is shared with all the functional items.

Of the multi-functional apparatus, some of them not only merely execute one of the functions but is able to effect plural functions in parallel. If there are many combinations of functions able to be effected in parallel, the above conventional display method is not always effective enough to improve the operativity.

For example, in a multi-functional apparatus incorporating the functions of a copier, printer and facsimile machine, there are functional items which can be performed in parallel in each of the functional modes, copier mode, printer mode and facsimile mode, as shown in Table 1.

TABLE 1

| | Image reading unit | Image forming unit | Fax line | Items compatible |
|---|---|---|---|---|
| Copy function | in operation | in operation | ready to operate | Copy: copy reservation, interrupt copy<br>Printer: print reservation (data reception)<br>Fax: memory sending, memory receiving |
| Printer function | ready to operate | in operation | ready to operate | Copy: copy reservation,<br>Scanner: OCR function<br>Fax; direct sending, memory sending, memory receiving |

TABLE 1-continued

| | Image reading unit | Image forming unit | Fax line | Items compatible |
|---|---|---|---|---|
| Fax Sending function | in operation | ready to operate | in operation | Copy: copy reservation data print<br>Print: print, print reservation (data receiving) |
| Receiving function | ready to operate | in operation | in operation | Copy: copy reservation<br>Printer: print reservation (data receiving)<br>Fax: memory sending<br>Scanner: OCR function |

That is, even during execution of a copying job, input for a next copy reservation and for an interrupt copy operation can be performed. For the printer function, the function of a print reservation for receiving the image data transmitted from an external apparatus and storing it into memory can be performed. For the facsimile function, the function of memory transmission/reception for sending/receiving image data between the image memory and an external apparatus can be performed.

It has been impossible for the conventional display method to explicitly display the functions capable of being performed in parallel with the function in operation, so that in the conventional configuration, the operator faces difficulty in selecting a number of functions compatible, exactly. The operator waiting for completion of an operation being currently performed would start the whole operation of a desired function only after the completion of the operation currently effected without knowing that part of the desired function can be effected in parallel. Thus, the conventional configuration has the problem of the usage capacity becoming lowered.

SUMMARY OF THE INVENTION

It is therefore an object of the present invention to provide a function display method which allows the operator to select multiple functions compatible, provides clear display for input of items to be set relating to these functions and can prevent operator's wrong operation as well as improving the usage capacity of the apparatus.

In order to achieve the above object, the present invention is configured as follows:

In accordance with the first aspect of the present invention, a function display method for giving information as to multiple functions selectable as the functions to be performed by an apparatus, on a display frame, includes the steps of: varying the display areas allotted for individual functions in the display frame, depending on whether each of the functions has been selected; and when one or more unselected functions are partly compatible with a selected function, displaying that fact within the display frame.

According to the first aspect of the present invention, the display areas allotted for multiple types of the functions performed by the apparatus are varied in position, shape, size, or the like, depending on whether each of the functions has been selected while part of the unselected functions, compatible with the already selected function is displayed within the display frame. Therefore, when a function is selected to be effected in the apparatus, the operator is able to readily recognize the selected state of each individual function, from the position, shape and size of the display area for each function in the display frame and can readily know from the display contents in the display frame if part of each function is available. Thus, the selection task of the functions can be simplified.

In the first configuration, the information relating to each function includes the information as to the operating units of the apparatus used for performing each function.

The second aspect of the present invention is characterized in that multiple pieces of information relating to the unselected functions are displayed using display areas equal in size while information relating to the selected function is displayed using a display area greater than that for the unselected function.

According to the second aspect of the present invention, multiple pieces of information relating to the unselected functions are displayed using display areas equal in size while information relating to the selected function is displayed using a display area greater than that for the unselected functions. Therefore, the display area of each function in the display frame is made large or small depending on whether the function is selected, so that the operator easily knows the selected state of each function from the size of the display area in the display frame when a function to be effected by the apparatus is selected. Further, the operator easily knows whether part of the functions is selectable, from the display contents in the display frame.

The third aspect of the present invention is characterized in that the display area allotted for a selected function is used to provide a display for input of selectable mode, either wholly or partly, of the other function, depending on the selected state of the selected functions.

According to the third aspect of the present invention, when the other function is selected, the display area allotted for the selected function is used to provide the display for input of selectable mode, either wholly or partly, of the other function, dependent on the selected states of the selected function. Therefore, when the apparatus operating conditions etc., as to the selected function are input, items to be set and guidance as to only the selectable mode, either wholly or partly, of the other function dependent on the selected state of the selected function are displayed within the display area allotted for the selected function, which means that there is no need for the operator to judge whether the desired function is selectable.

The fourth aspect of the present invention is characterized in that when a second function has been selected subsequently after selection of a first function, a display area for the second function is used to provide the display for input only of selectable mode, either wholly or partly, of the function, compatible with the first function.

According to the fourth aspect of the present invention, when multiple functions have been selected, the display area for the subsequently selected function is used to provide the display for input only of selectable mode, either wholly or partly, of the function, compatible with the previously selected function. Therefore, when the apparatus operating conditions etc., as to the subsequently selected function is input, items to be set and guidance as to only the selectable mode, either wholly or partly, of the function, compatible with the previously selected function are displayed, which means that there is no need for the operator to judge whether the desired function is compatible with the previously selected function when the operating conditions of the subsequently selected function is input.

BRIEF DESCRIPTION OF THE DRAWINGS

FIGS. 5A to 5D are diagrams showing progressive display frame changes on the same display;

FIGS. 7A to 7D are diagrams showing progressive display frame changes on the same display; and FIGS. 8A to 8D are diagrams showing progressive display frame changes on the same display.

DESCRIPTION OF THE PREFERRED EMBODIMENTS

Figure 1:
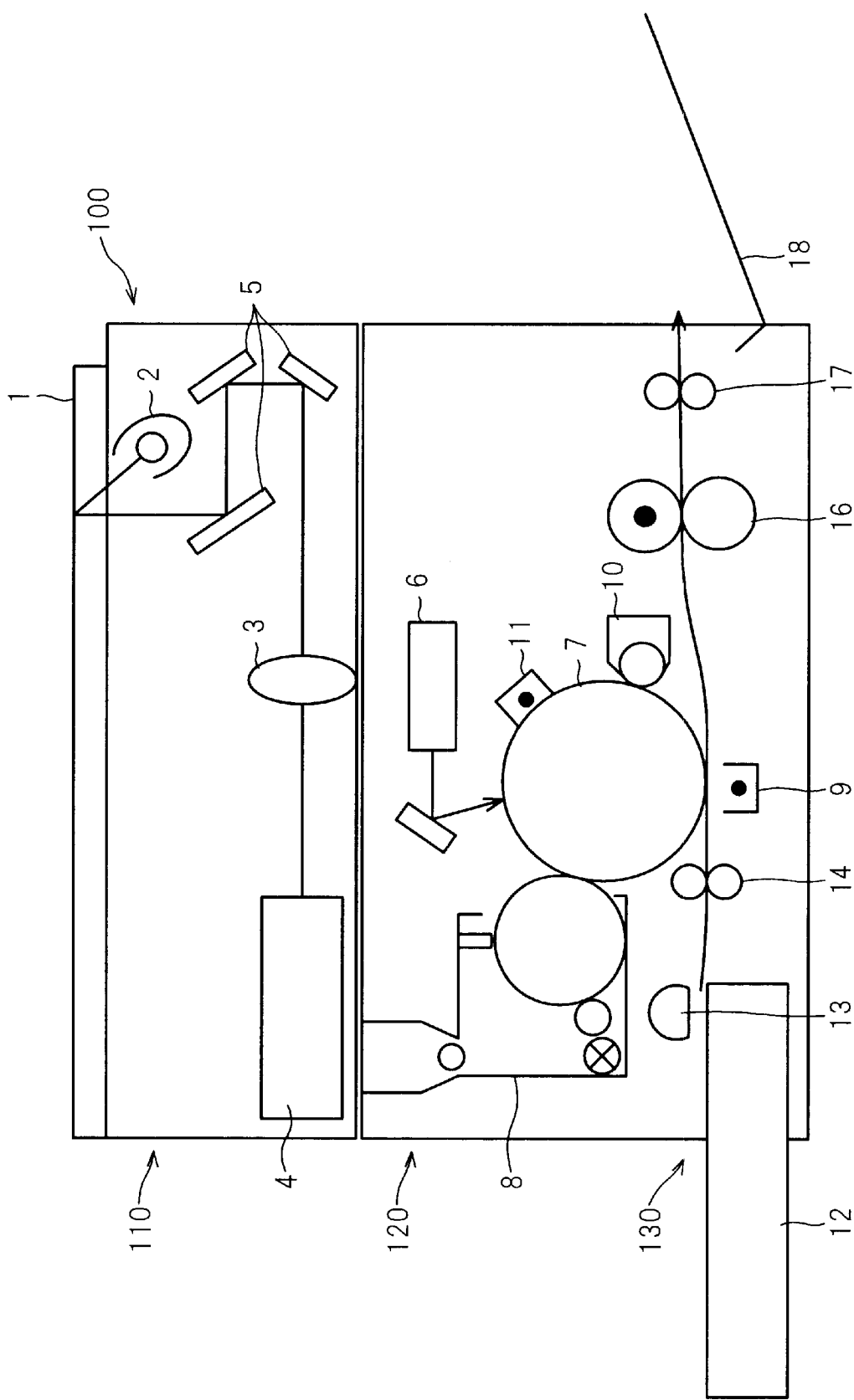
FIG. 1 is a schematic view showing a configuration of an image forming apparatus to which a function display method according to an embodiment of the present invention is applied.

FIG. 1 is a schematic view showing a configuration of an image forming apparatus to which a function display method according to an embodiment of this invention is applied. This image forming apparatus, designated at 100, is a multi-functional machine incorporating copier, printer and facsimile functions, and is configured of an image reading unit 110, an image forming unit 120 and a paper feed portion 130. Image reading unit 110 includes an original table 1, an illuminating lamp 2, mirrors 5, a lens 3 and an image processing unit 4. In image reading unit 110, illuminating lamp 2 and mirrors 5 are moved in a reciprocating manner in the horizontal direction along the underside of original table 1 so that the image face of the original placed on original table 1 is illuminated and optically scanned by the light emitted from illuminating lamp 2. The light emitted from illuminating lamp 2 and reflected by the image face of the original passes through mirrors 5 and lens 3, being focused on the light receiving face of the photoelectric transducer (CCD) of image processing unit 4. Image processing unit 4 performs A/D conversion and predetermined image processes on the CCD's received light signals to produce image data, which is stored into an unillustrated image memory.

Image forming unit 120 has a rotatably supported photosensitive drum 7 at the center thereof and a charger 11, scanner unit 6, developing device 8, transfer device 9 and cleaner 10, all arranged around and opposing the drum in this sequential order. Formed on the surface of photosensitive drum 7 is a photosensitive layer that presents photoconductivity. Charger 11 gives charges of a single polarity uniformly over the photosensitive drum 7 surface. Scanner unit 6 illuminates image light on the photosensitive drum 7 surface by laser beams or the like, modulated by the image data stored in the image memory of image processing unit 4 so as to from an electrostatic latent image on the photosensitive drum 7 surface by the photoconductive function of the photosensitive layer. Developing device 8 supplies the developer to the photosensitive drum 7 surface so as to visualize the static latent image into the developer image. Transfer device 9 transfers the developer image supported on the photosensitive drum 7 surface to the surface of the paper conveyed between the transfer device and the photosensitive drum 7 surface. Cleaner 10 removes the developer and the like residing on the surface of photosensitive drum 7 after completion of the transfer step.

Paper feed portion 130 is composed of a paper feed cassette 12 attached on one side of image forming apparatus 100, a paper output tray 18 attached on the other side of image forming apparatus 100 and the paper conveyance path lying from the cassette to the output tray by way of the space between photosensitive drum 7 and transfer device 9. Arranged along this paper conveyance path are a delivery roller 13, registration rollers 14, fixing rollers 16 and paper discharge rollers 17. Paper feed portion 130 causes delivery roller 13 to start rotating prior to the rotation of photosensitive drum 7, to thereby deliver the paper, sheet by sheet from the stack of paper in paper feed cassette 12. Subsequently, paper feed portion 130 causes registration rollers 14 to start rotating in synchronism with the rotation of photosensitive drum 7, so as to convey the paper delivered from paper feed cassette 12 to and between photosensitive drum 7 and transfer device 9. Fixing rollers 16 heat and press the paper with a developer image transferred thereon so as to fuse the developer image and fix it fast onto the paper. Paper discharge rollers 17 discharge the paper with a developer image fixed thereon to paper output tray 18.

In image forming apparatus 100 thus configured, in the copier mode process, image forming unit 120 forms duplicated images on the paper in accordance with the image data scanned by image reading unit 110 from the originals placed on original table 1. Further, in the printer mode process, image forming unit 120 forms images on the paper in accordance with the image data input from an external apparatus. In the facsimile mode process, image reading unit 110 scans images from the originals placed on original table 1 so that the scanned image data is transmitted via public telephone networks to an external facsimile machine while, for the reception process, image forming unit 120 forms received images on the paper in accordance with the image data received by way of public telephone networks.

Image data input from an external apparatus while performing a printing job as well as image data received by way of public telephone networks while performing a facsimile receiving job, is subjected to predetermined image processes in image processing unit 4 and then the processed data is stored into the image memory. Image data scanned from originals by image reading unit 110 during execution of a facsimile transmitting job is subjected to predetermined image processes in image processing unit 4 and the processed data is stored into the image memory.

Accordingly, while performing a copy job, image forming apparatus 100 actuates image reading unit 110, image forming unit 120 and paper feed portion 130. While performing a printer job and facsimile receiving job, the apparatus actuates image forming unit 120, paper feed portion 130. During performance of a facsimile transmitting function, the apparatus actuates image reading unit 110. Therefore, when image forming apparatus 100 is engaged with a copier function, printer function or facsimile function, image reading unit 110, image forming unit 120 and the fax line will operate as shown in Table 1. Thus, the processes shown in 'items compatible' in the table can be carried out at the same time.

Figure 2:
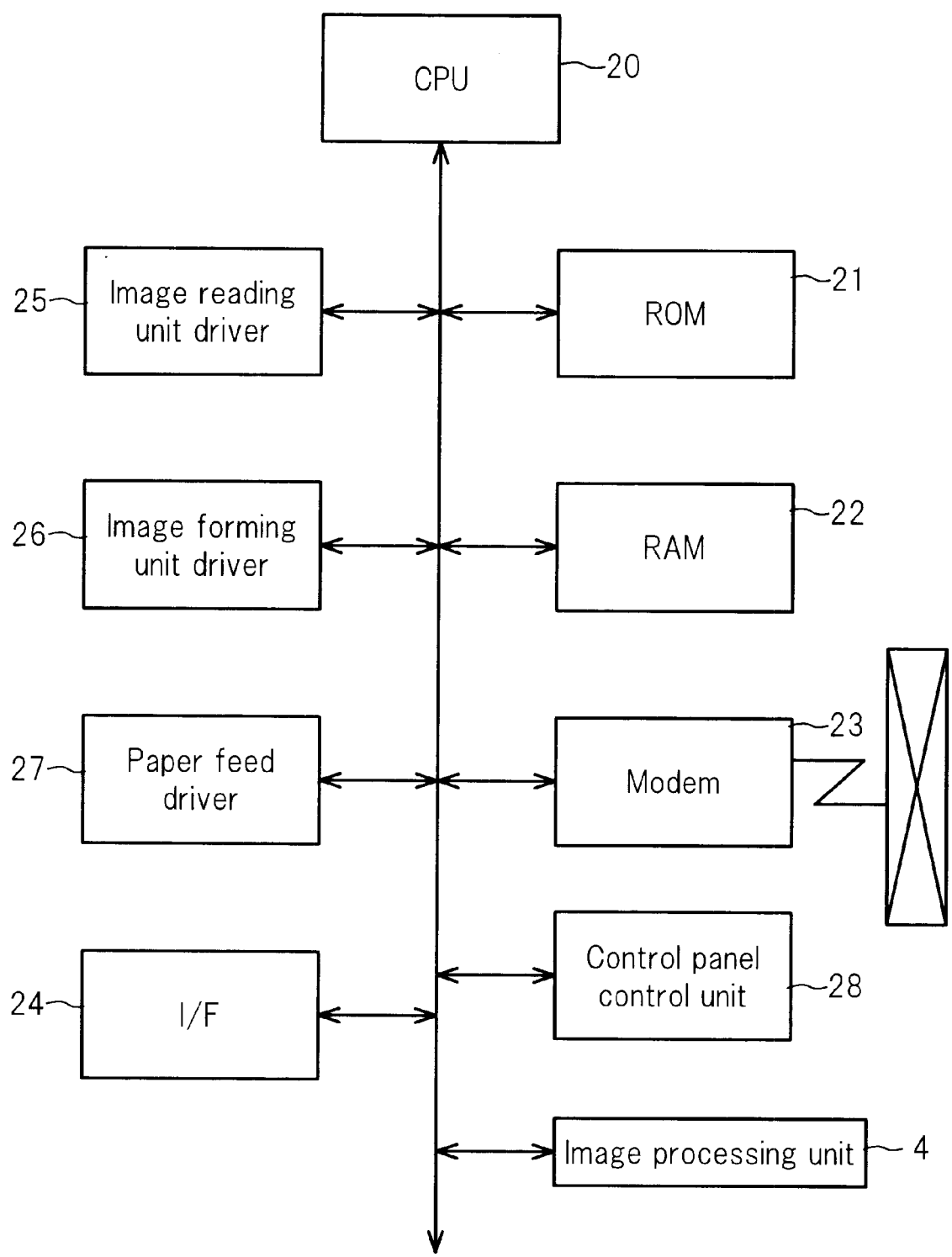
FIG. 2 is a block diagram showing the controller of the image forming apparatus.

FIG. 2 is a block diagram showing the essential configuration of the controller of the image forming apparatus. The controller of image forming apparatus 100 (FIG. 1) incorporates a CPU 20 with a ROM 21 and RAM 22 and further includes input/output devices such as a modem 23, an interface 24, an image reading unit driver 25, an image forming unit driver 26, a paper feed driver 27, a control panel control unit 28, an image processing unit 4 (FIG. 1) and the like, all connected to the CPU. Modem 23 is connected to public telephone networks. That is, for the facsimile transmission process, the modem calls the phone number of a destination facsimile machine designated through the control panel, on the public telephone network and transmits image data whilst modulating. For the facsimile receiving process, the modem receives the image data transmitted from a remote site facsimile machine by way of the public telephone network, supplies the image data to image processing unit 4 whilst demodulating. Interface 24 is connected to external apparatuses such as personal computers etc., via data communication lines so as to supply the image data output from external machines to image processing unit 4.

Image reading unit driver 25, image forming unit driver 26 and paper feed driver 27, based on the control data output from CPU 20, drives load devices such as motors, solenoids, clutches, etc., incorporated in image reading unit 110, image forming unit 120 and paper feed portion 130 (shown in FIG. 1) so as to cause image reading unit 110, image forming unit 120 and paper feed portion 130 to effect the above-stated operations. Control panel control unit 28 governs key switches and the display arranged in an unillustrated control panel provided on the top of image forming apparatus 100. Control panel control unit 28 provides the control data input through the key switches to CPU 20 and displays the display data output from CPU 20 on the display. As already stated, image processing unit 4 incorporates an CCD, a variety of image processors and image memory and subjects the image data read from originals by image reading unit 110 and the image data received from a facsimile machine or external device to predetermined image processes and stores the processed data into the image memory.

CPU 20 integrally governs the aforementioned input/output devices in accordance with the programs stored previously in ROM 21 and temporarily stores the data input and output during this control into RAM 22. ROM 21 also holds the display data of display frames to be displayed on the display of the control panel in accordance with the operated states of the key switches on the control panel by the operator. CPU 20, following the control data etc., designated by the key switches and input from control panel control unit 28, reads from ROM 21 the display data of a display frame to be displayed on the display and outputs it to control panel control unit 28. The display arranged in the control panel may have a touch panel over the top surface. In this case, the key switches from which control panel control unit 28 detects the control data should include the touch panel over the top surface of the display.

FIGS. 3 to 5 are diagrams showing progressive display frame changes on the display portion of the image forming apparatus, to which the function display method in accordance with the embodiment of this invention is applied. The function display method in accordance with this embodiment changes the display contents on the display in the control panel, with reference to Table 1, i.e., the operational states of all the units during each function and the items compatible. The display frame in the display, designated at 30, arranged in the control panel in image forming apparatus 100 has a guidance display area 31 arranged at the top for providing guidance to the operator and an operational state display area 33 arranged at the bottom for displaying the operational states of image reading unit 110, image forming unit 120 and the fax line(modem 23). The display frame further includes a function information display area 32 arranged between guidance display area 31 and operational state display area 33, for displaying the information relating to the copier, printer and facsimile functions.

Figure 3A:
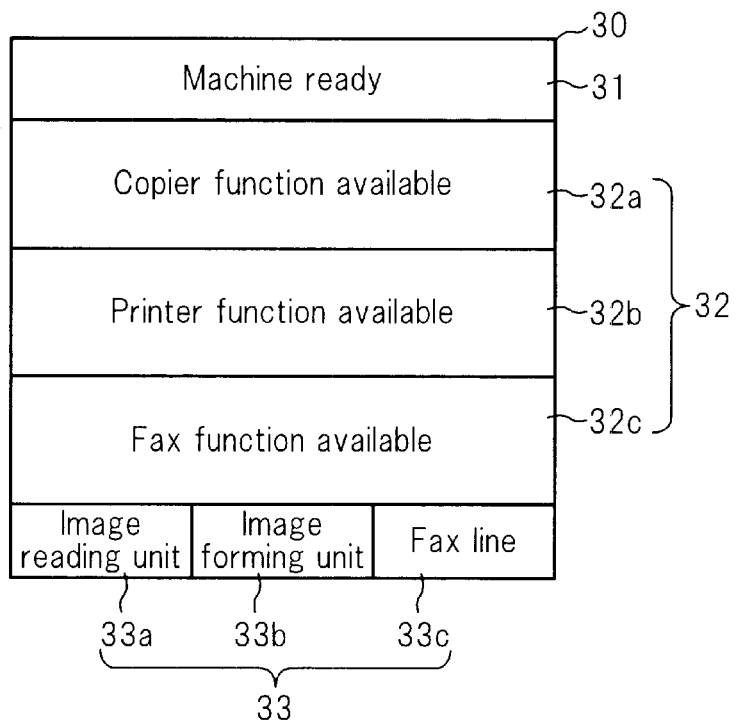
FIGS. 3A and 3B are diagrams showing progressive display frame changes on the display of the image forming apparatus.

When image forming apparatus 100 is not engaged with any of the copier, printer and facsimile functions, being ready and waiting for operator's function selection, the guidance 'Machine ready' is displayed in guidance display area 31 as shown in FIG. 3A while display sections 33a to 33c for image reading unit 110, image forming unit 120 and the fax line in operational state display area 33, respectively, are displayed, side by side, with the same brightness. Function information display area 32 displays 'Copier ready', 'Printer ready', 'Fax ready', in three equi-sized display sections 32a to 32c arranged vertically. The operator having viewed the display frame shown in FIG. 3A recognizes from the display contents in guidance display area 31 that image forming apparatus 100 is in the ready state, recognizes from the display contents in operational state display area 33 that image reading unit 110, image forming unit 120 and modem 23 are not in operation, and recognizes from the display contents in function information display area 32 that any of the functions: copier function, printer function and facsimile function is selectable.

In the ready state where the display frame shown in FIG. 3A is displayed in display 30, when a print request with image data is input from an external device via interface 24, CPU 20 distributes control data to image processing unit 4, image forming unit driver 26 and paper feed driver 27 to actuate image forming unit 120 and paper feed portion 130(FIGS. 1 and 2). At the same time, the display frame on display 30 changes to that shown in FIG. 3B. Specifically, guidance display area 31 provides the guidance 'Machine is in progress' while in operational state display area 33, display section 33b for 'Image forming unit' is displayed lower in brightness than display sections 33a and 33c for 'Image reading unit' and 'Fax line'. In function information display area 32, a message 'Printer function engaged' with the operating conditions of image processing is displayed in the combined area of display sections 32a and 32b while messages 'Copier function partly available' and 'Facsimile function partly available' are displayed in the left and right halves of display section 32c.

In this way, during the printer function process, in function information display area 32, the information relating to the printer function is displayed in the display area four times as large as that for the copier function and that for the facsimile function. Accordingly, the operator having viewed the display frame shown in FIG. 3B recognizes from the display contents in guidance display area 31 that image forming apparatus 100 is in progress, recognizes from the display contents in operational state display area 33 that image forming unit 120 is in operation, and recognizes from the display contents in function information display area 32 that processing relating to the printer function is being performed while part of the copier function and part of facsimile function are selectable.

Figure 3B:
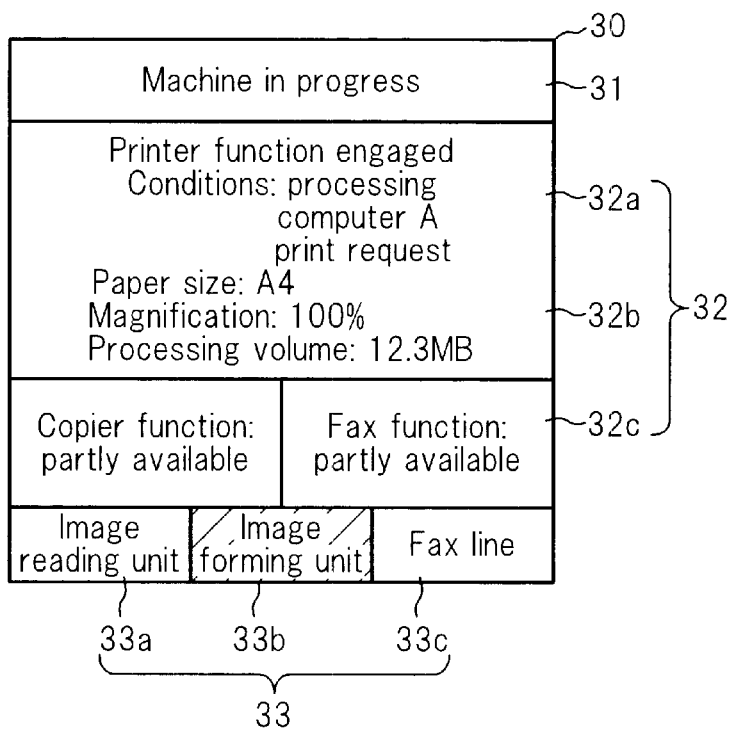
Figure 4A:
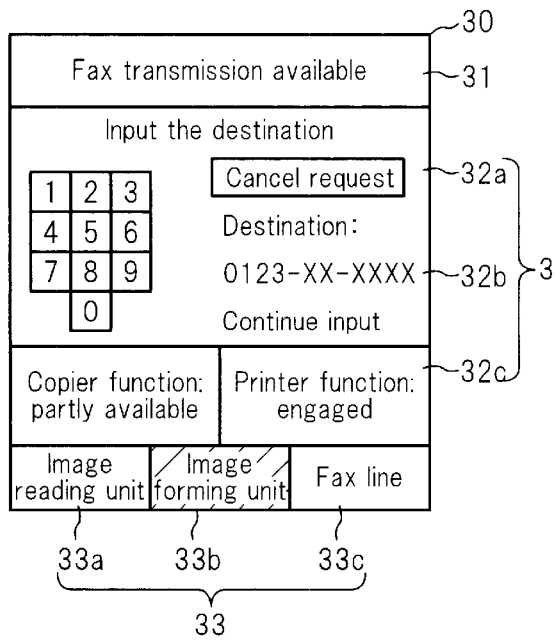
FIGS. 4A to 4D are diagrams showing progressive display frame changes on the same display.

During processing of the job relating to the printer function as in the display frame shown in FIG. 3B is displayed in display 30, when the operator selects the facsimile function by operating the key switch allotted for selection of the facsimile function, or by pressing an area 32c that displays the message 'facsimile function partly available' on the touch panel laid over display 30, the display frame on display 30 changes to that shown in FIG. 4A. Specifically, guidance display area 31 provides the guidance 'Fax transmission available' while in operational state display area 33, display section 33b for 'Image forming unit' is displayed lower in brightness than display sections 33a and 33c for 'Image reading unit' and 'Fax line'. In function information display area 32, the display contents relating to the entry of a remote receiver to which facsimiles are transmitted are displayed in display sections 32a and 32b while messages 'Copier partly available' and 'Printer engaged' are displayed in the left and right halves of display section 32c.

In this way, once the facsimile function is selected during execution of a printer job, in function information display area 32, the display for input of the entry for the facsimile transmission function as a mode of the facsimile function that can be performed in parallel with the currently executed printer function is displayed in the display area four times as large as that for the copier function and that for the printer function. Accordingly, the operator having viewed the display frame shown in FIG. 4A recognizes from the display contents in guidance display area 31 that the facsimile transmission mode of the facsimile function is available, recognizes from the display contents in operational state display area 33 that image forming unit 120 is in operation, and recognizes from the display contents in function information display area 32 that entry of the phone number of the destination facsimile machine to which the image data is to be transmitted can be made.

Figure 4B:
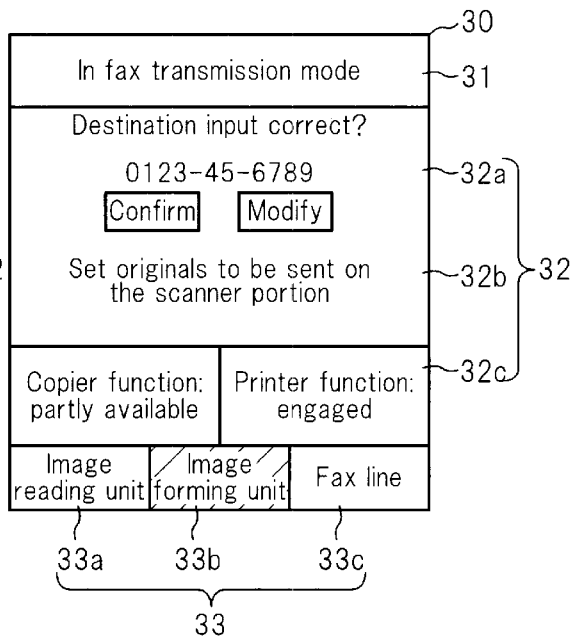

In the state where in the display frame shown in FIG. 4A is displayed in display 30, when a destination telephone number of a facsimile machine is input by the operator, the display frame on display 30 changes to that shown in FIG. 4B. Specifically, the display sections 32a and 32b allotted for that for the information relating to the facsimile function in the display frame shown in FIG. 4A are used to display a message that urges the operator to confirm the destination phone number of the facsimile machine as well as to display the message with confirm and modify keys, which suggests that originals to be transmitted should be set to image reading unit 110. Guidance display area 31 provides the guidance 'Fax transmission function engaged'. Other display contents are the same as that shown in FIG. 4A.

In the state where the display frame shown in FIG. 4B is displayed in display 30, when the operator operates the modify key, the display frame on display 30 returns to that shown in FIG. 4A. When the operator operates the confirm key, the display frame on display 30 changes to that shown in FIG. 4C. That is, the display sections 32a and 32b which have been allotted for the information relating to the facsimile function in the display frames shown in FIGS. 4A and 4B are used to display the message with 'transmit' and 'cancel', which urges the operator to decide whether the facsimile transmission is to be effected. Other display contents are the same as that shown in FIGS. 4A and 4B.

Figure 4C:
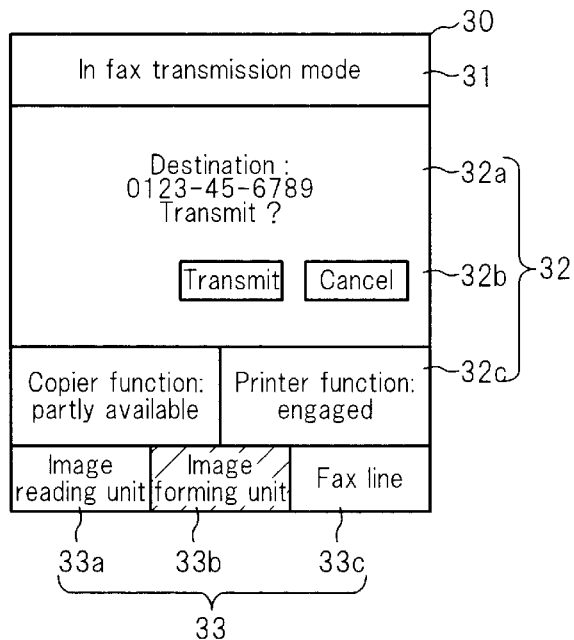

Accordingly, as the operator views the display frames shown in FIGS. 4B and 4C, it is possible to easily effect input of the operating conditions relating to the facsimile transmission function.

In the state where the display frame shown in FIG. 4C is displayed in display 30, when the operator operates the 'cancel' key, the display frame on display 30 returns to that shown in FIG. 4A. When the operator operates the 'transmit' key, image forming apparatus 100, whilst performing the job relating to the printer function in parallel, performs the job relating to the facsimile function. That is, image reading unit 110 scans image data from the originals and the scanned image data is transmitted to the destination facsimile machine by way of modem 23 (FIGS. 1 and 2).

Figure 4D:
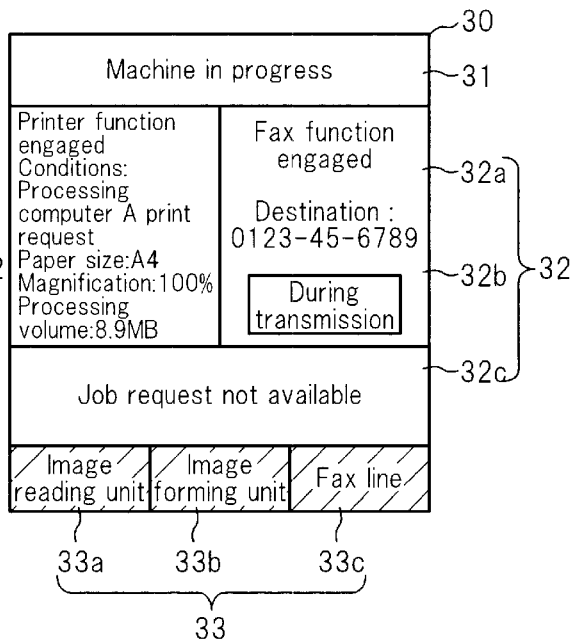

The display frame on display 30 changes to that shown in FIG. 4D. Illustratively, in the display frames shown in FIGS. 4A to 4C, display sections 32a and 32b allotted for the display area for the information relating to the facsimile function is used to display messages of jobs relating to the printer and facsimile functions being executed, while display section 32c is used to display a message that no job request (no job request relating to the copy function) will be accepted. Guidance display area 31 provides guidance such as 'Machine is in progress' while in operational state display area 33, display sections 33a to 33c with respect to image reading unit, image forming unit and Fax line respectively, are all displayed lower in brightness.

Accordingly, the operator having viewed the display frame shown in FIG. 4D recognizes from the display contents in guidance display area 31 and function information display area 32, that image forming apparatus 100 is performing a job relating to the printer function and a job relating to the facsimile function and will not allow any other job. The operator also recognizes from the display contents in operational state display area 33 that image reading unit 110, image forming unit 120 and mode 23 are in operation.

During the processing of the job relating to the printer function as the display frame shown in FIG. 3B, when the operator selects the copier function by operating the key switch allotted for selection of the copier function, or by pressing the area that displays the message 'Copier function partly available' on the touch panel laid over display 30, the display frame on display 30 changes to that shown in FIG. 5A. Specifically, guidance display area 31 provides the guidance 'Copy reservation available' while in operational state display area 33, display section 33b for 'Image forming unit' is displayed lower in brightness than display sections 33a and 33c for 'Image reading unit' and 'Fax line'. In function information display area 32, the display contents as to whether a copy reservation is to be made are displayed in display sections 32a and 32b while messages 'Printer function engaged' and 'Facsimile function partly available' are displayed in the left and right halves of display section 32c.

In this way, once the copier function is selected during execution of the printer function, in function information display area 32, the display for input of the entry for the copy reservation function as a mode of the copier function that can be performed in parallel with the currently executed printer function is displayed in the display area four times as large as that for the printer function and that for the facsimile function. Accordingly, the operator having viewed the display frame shown in FIG. 5A recognizes from the display contents in guidance display area 31 that the copy reservation mode of the copier function is available, recognizes from the display contents in operational state display area 33 that image forming unit 120 is in operation, and recognizes from the display contents in function information display area 32 that the copy reservation function can be performed.

In the state where the display frame shown in FIG. 5A is displayed in display 30, when the operator selects the copy reservation function, the display frame on display 30 changes to that shown in FIG. 5B. Specifically, in FIG. 5B, the display sections 32a and 32b allotted for the information relating to the copier function in the display frame shown in FIG. 5A are used to display the message that urges the operator to set originals to be transmitted on image reading unit 110 and the message that urges the operator to input the original reading conditions, with original type selection keys, magnification setup keys, confirm and modify keys. Guidance display area 31 provides the guidance 'Machine engaged in copy reservation mode'. Other display contents are the same as that shown in FIG. 5A.

In the state where the display frame shown in FIG. 5B is displayed in display 30, when the operator operates the modify key, the display frame on display 30 returns to that shown in FIG. 5B. When the operator operates the confirm key after completion of the input of the original reading conditions, the display frame on display 30 changes to that shown in FIG. 5C. That is, the display sections 32a and 32b which have been allotted for the information relating to the copier function in the display frames shown in FIGS. 5A and 5B are used to display the message, with the confirm and modify keys, as to when the reserved copy job should be effected. Other display contents are the same as that shown in FIGS. 5A and 5B.

Accordingly, as the operator views the display frames shown in FIGS. 5B and 5C, it is possible to easily effect input of the operating conditions relating to the copy reservation function.

In the state where the display frame shown in FIG. 5C is displayed in display 30, when the operator operates the modify key after input of the schedule of a copy job, the display frame on display 30 returns to that shown in FIG. 5C. When the operator operates the confirm key, image forming apparatus 100 (FIG. 1), whilst performing the job relating to the printer function in parallel, performs the job relating to the copy reservation function. That is, image reading unit 110 (FIG. 1) scans image data from the originals and the scanned image data is stored into the image memory.

At the same time, the display frame on display 30 changes to that shown in FIG. 5D. Illustratively, in the display frames shown in FIGS. 5A to 5C, display sections 32a and 32b allotted for the display area for the information relating to the copier function are used to display messages that a job relating to the printer function is performed and that a job relating to the copier function is performed, while display section 32c is used to display a message that no job request other than the facsimile reception function to memory (no job request relating to the facsimile transmission function) will be accepted. Guidance display area 31 provides the guidance 'Machine is in progress' while in operational state display area 33, display sections 33a and 33b for 'Image reading unit' and 'Image forming unit' are displayed lower in brightness than display section 33c for 'Fax line'.

Accordingly, the operator having viewed the display frame shown in FIG. 5D recognizes from the display contents in guidance display area 31 and function information display area 32, that image forming apparatus 100 is performing a job relating to the printer function and a job relating to the copier function and will not allow any job relating to the facsimile transmission function. The operator also recognizes from the display contents in operational state display area 33 that image reading unit 110 and image forming unit 120 are in operation and mode 23 is not in operation.

As has been described heretofore, according to the function display method according to this embodiment, information relating to a job which is in progress is displayed using a greater display area than that for a job which is not in operation. A function which has been selected to be performed is displayed using a greater display area than that for a job which is not selected as to be performed. Therefore, the operator is able to readily know from the display contents in display 30 the information as to a function which is under way and the information as to a function which has been selected. Further, this method provides an input entry reception display for items to be set such as operating conditions etc., only for the functions which are compatible with the function that has been already set in progress. Therefore, this configuration facilitates the operator to set up multiple functions in parallel without the necessity of taking into consideration whether the desired function is available.

In the above example, it is also possible to select another function after a function has been selected and before the job of the function is started. For example, in the state shown in FIG. 3A, after the operator has selected the facsimile transmission function and has input the necessary operating conditions, the printer function is available at that point. In this situation, when the printer function is selected, the printer function is fully accepted because image forming apparatus 120 (FIG. 1) is not busy. When input of the necessary operating conditions as to the facsimile transmission function has been completed, image forming reading unit 110 (FIG. 1) and the fax line are not in operation, so the copier function is also available. However, if the function which is first selected is adapted to have priority, the copy reservation function or image forming of image data having been read beforehand alone can be performed in parallel because image reading unit 110 is to be used for the facsimile transmission function.

In this case, when a function is selected, or when the input operation as to the function is completed and before the job operation relating to the function is started, the display section, in the operational state display area, corresponding to the operating unit used for the job of the selected function may be made darker or lower in brightness and at the same time the display contents in the display areas relating to information for the other functions may be altered. By this configuration, the operator, upon selection of multiple functions, is able to readily and exactly recognize from the display contents in the display frame which function is selectable for the subsequent selection.

Figure 6A:
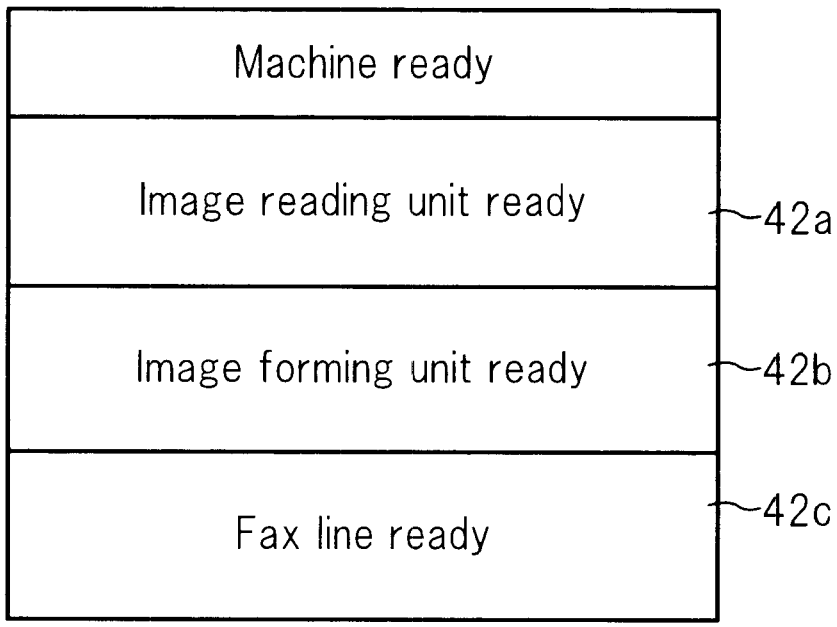
FIGS. 6A and 6B are diagrams showing progressive display frame changes on the display of an image forming apparatus to which a function display method according to another embodiment of the present invention is applied.
Figure 6B:
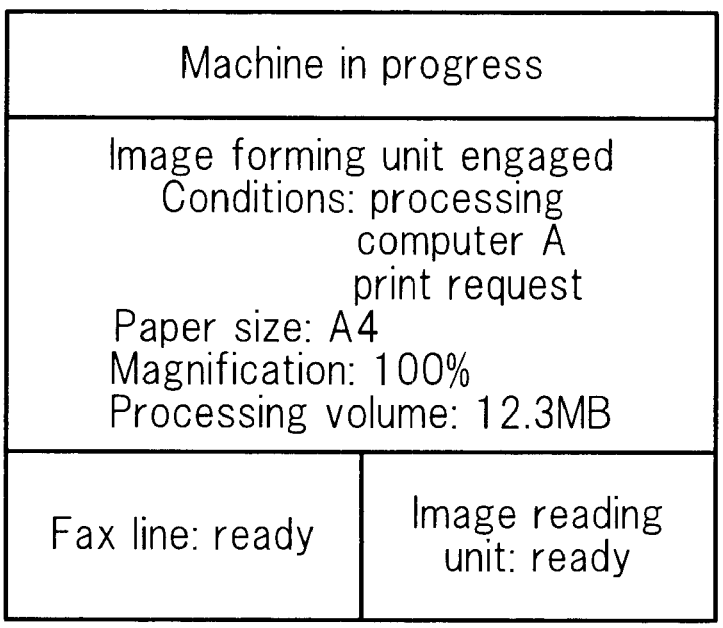

In the function display method according to the above embodiment, the display area for information as to each function, the copier function, printer function or facsimile function, is formed within the display frame. When the selecting operation of these functions is performed using key switches outside the display, the display frame on display 30 may only include the display areas for providing information as to operational states of individual operating units, i.e., image reading unit, image forming unit and fax line, as shown in FIGS. 6 through 8. Here, FIGS. 6A and 6B, FIGS. 7A to 7D and FIGS. 8A to 8D corresponds to FIGS. 3A and 3B, FIGS. 4A to 4D and FIGS. 5A to 5D, respectively.

In the examples shown in FIGS. 6 to 8, in the ready and waiting state, display sections 42a to 42c equal in size are displayed (FIG. 6A) to give messages that image reading unit 110, image forming unit 120 and fax line(modem 23) are ready. In this state, when a print request is given from an external device, the message indicating that image forming unit 120 is in progress is displayed using a greater display area than those indicating that image reading unit 110 and the fax line are waiting (FIG. 6B). Further, when the operator selects the facsimile function while the printer function is in progress, the display frames change as shown in FIGS. 7A to 7D. When the copy function is selected, the display frame changes as shown in FIGS. 8A to 8D.

Thus, the above way of display makes it possible to reduce the contents to be displayed within the display frame, leading to making the display compact as well as improving the visibility of the display contents. Here, the key point of this method is that the operator is able to easily recognize the relationship between the operational states of the individual operating units and selectable functions.

In the above description, an image forming apparatus which incorporates copier, printer and facsimile functions has been taken as an example of the image forming apparatus to which the function display method of the above embodiment is applied. The function display method of this invention can be applied in a similar manner to an apparatus that includes, in addition to the above functions, a scanner function for outputting the image data scanned by the image reading unit to external apparatus such as personal computers. Alternatively, this invention can be applied similarly to an apparatus of a multi-functional type other than image forming apparatus.

According to the present invention, the following effects can be obtained.

(1) The display areas allotted for multiple types of the functions performed by the apparatus are varied in position, shape, size, or the like, depending on whether each of the functions has been selected while part of the unselected functions, compatible with the already selected function is displayed within the display frame. In this arrangement, when a function is selected to be effected in the apparatus, the operator is able to readily recognize the selected state of each individual function, from the position, shape and size of the display area for each function in the display frame and can readily know from the display contents in the display frame whether part of each function is available. Thus, it is possible to improve the usage capacity of the apparatus, by simplifying the selection task of the functions.

(2) Multiple pieces of information relating to the unselected functions are displayed using display areas equal in size while information relating to the selected function is displayed using a display area greater than that for the unselected functions. In this way, the display area of each function in the display frame is made large or small depending on whether the function is selected, so as to enable the operator to easily understand the selected state of each function from the size of the display area in the display frame when a function to be effected by the apparatus is selected. Further, the operator is able to easily understand whether part of the functions is selectable, from the display contents in the display frame.

(3) When the other function is selected, the display area allotted for the selected function is used to provide the display for input of selectable modes, either wholly or partly, of the other function dependent on the selected state of the selected function. Therefore, when the apparatus operating conditions etc., as to the selected function are input, items to be set and guidance as to only the selectable mode, either wholly or partly, of the other function dependent on the selected state of the selected function are displayed within the display area allotted for the selected function, whereby it is possible to simplify the input task without the necessity of the operator's judgment as to whether the desired function is selectable.

(4) When multiple functions have been selected, the display area for the subsequently selected function is used to provide the display for input only of selectable mode, either wholly or partly, of the function, compatible with the previously selected function. Therefore, when the apparatus operating conditions etc., as to the subsequently selected function is input, items to be set and guidance as to only the executable modes in whole or in part of the function, compatible with the previously selected function are displayed, thus making it possible to simplify the input task without the necessity of the operator's judgment as to whether the desired function is compatible with the previously selected function when the operating conditions of the subsequently selected function is input.

What is claimed is:

1. A function display method for giving information as to multiple functions selectable as functions to be performed by an apparatus, on a display screen, comprising the steps of:

varying display areas allotted for individual functions in a display frame, depending on whether each of the functions has been selected; and when one or more unselected functions are partly compatible with a selected function, displaying that fact within the display frame.

2. The function display method according to claim 1, wherein multiple pieces of information relating to the unselected functions are displayed using display areas equal in size while information relating to the selected function is displayed using a display area greater than that for the unselected function.

3. The function display method according to claim 1, wherein a display area allotted for the selected function is used to provide a display for input of selectable mode, either wholly or partly, of the other function depending on the selected state of the selected function.

4. The function display method according to claim 2, wherein the display area allotted for the selected function is used to provide a display for input of selectable mode, either wholly or partly, of the other function depending on the selected state of the selected function.

5. The function display method according to claim 3 or 4, wherein when a second function has been selected subsequently after selection of a first function, the display area for the subsequently selected function is used to provide the display for input only of selectable mode, either wholly or partly, of the function, compatible with the previously selected function.

6. A multi-functional apparatus comprising:

a display screen for giving information of multiple functions incorporated in the multi-functional apparatus, multiple function display areas allotted for individual functions on the display screen, and wherein the function display area can be varied such that a first function display area allotted for a first selected function becomes larger than an unselected function display area allotted for an unselected function, where the unselected function display area displays information relating to a state of the unselected function.

7. The multi-functional apparatus according to claim 6, wherein the multiple functions include image forming functions.

8. A multi-functional apparatus comprising:

a display screen for giving information of multiple functions incorporated in the multi-functional apparatus;

multiple function display areas allotted for individual functions on the display screen; and wherein the function display area can be varied such that a first function display area allotted for a first selected function becomes larger than an unselected function display area allotted for an unselected function, where the unselected function display area displays information relating to a selectable state of the unselected function.

9. The multi-functional apparatus according to claim 8, wherein a second function display area allotted to a second function becomes greater while the first function display area becomes smaller when the second function has been selected.

10. The multi-functional apparatus according to claim 9, wherein the second function display area is used to provide the display for input of the second function.

11. The multi-functional apparatus according to claim 10, wherein the first function display area and the second function display area become equal in size after completion of input of the information of the second function.

12. The multi-functional apparatus according to claim 8, wherein the multiple functions include image forming functions.

13. A multi-functional apparatus comprising:

a display screen for giving information of multiple functions incorporated in the multi-functional apparatus;

multiple function display areas allotted for individual functions on the display screen;

wherein the function display area can be varied such that a first function display area allotted for a first selected function becomes larger than an unselected function display area allotted for an unselected function; and an operational state display area displaying an operational state of an image forming apparatus on the display screen.

* * * * *